United States Patent [19]

Lewiner et al.

[11] Patent Number: 4,567,530
[45] Date of Patent: Jan. 28, 1986

[54] READ-OUT DEVICES OF ELECTRIC CHARGE DISTRIBUTIONS ON DIELECTRIC SURFACES

[76] Inventors: Jacques Lewiner, 5, rue Bory d'Arnex, 92210 Saint Cloud, France; Georges Charpak, 14, rue di Clos, Geneve, Switzerland

[21] Appl. No.: 486,208

[22] Filed: Apr. 18, 1983

[30] Foreign Application Priority Data

Apr. 19, 1982 [FR] France ............................ 82 06675

[51] Int. Cl.⁴ ............................................. H04N 1/18
[52] U.S. Cl. ..................................... 358/295; 358/111
[58] Field of Search .................. 358/110, 111, 295; 346/155; 250/315.3

[56] References Cited

U.S. PATENT DOCUMENTS

| 4,134,137 | 1/1979 | Jacobs | 358/295 |
| 4,385,306 | 5/1983 | Conta | 346/155 |
| 4,450,489 | 5/1984 | Barry | 346/155 |

Primary Examiner—Howard W. Britton
Attorney, Agent, or Firm—Larson and Taylor

[57] ABSTRACT

In order to read-out and reproduce as a visible image the electric charge distribution carried by a dielectric sheet, and formed by the impact of X-rays having traversed a body to be analyzed, one has recourse to a detecting probe (2) out of center with respect to the axis of a head carrying the probe, the head being put in rotation at a high speed (for instance at 6,000 turns/minute), by a small turbine, the axis of the head being displaced relative to the surface of the sheet, parallel to the sheet along two perpendicular directions X and Y in such a way that the probe scans the sheet along a trajectory (T) which has the form of a circle the center of which is subjected to a transverse translation. The read-out can be made very rapidly and leads to a good signal/noise ratio. This allows the use of low irradiation doses for the object to be analyzed. Means can be used to compensate for variations of distance between the probe and the sheet.

13 Claims, 8 Drawing Figures

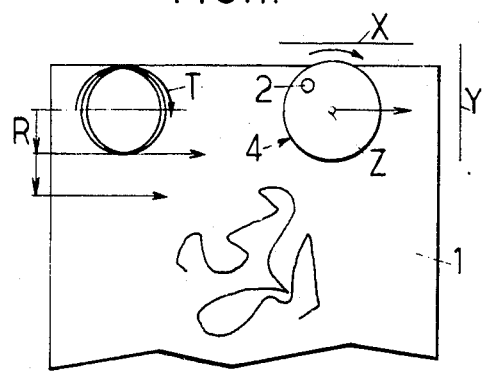
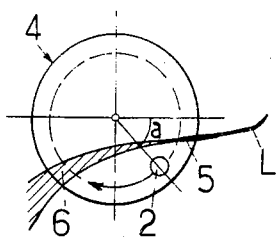
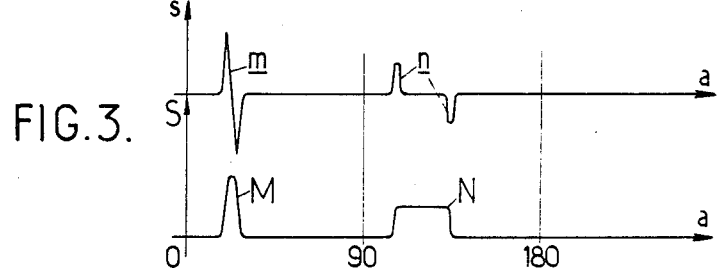
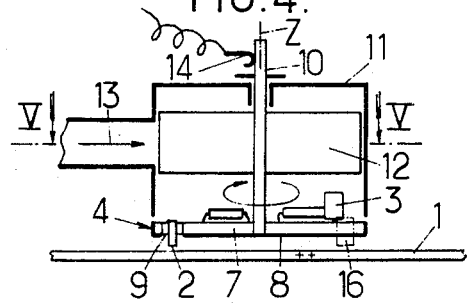
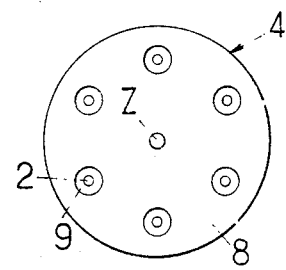
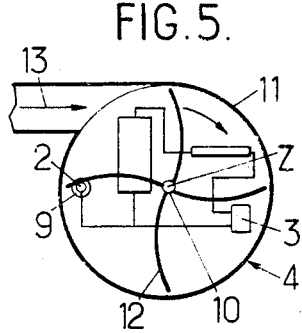
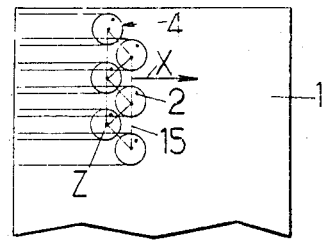

READ-OUT DEVICES OF ELECTRIC CHARGE DISTRIBUTIONS ON DIELECTRIC SURFACES

The invention concerns the read-out of electric charges carried by a dielectric sheet. The word "sheet" as used in the context of the invention is to be interpreted broadly, and covers a sheet, or a similar support for charges, like a plate, or a layer deposited on an other surface. The electric charges are related for instance to a radiographic image, the above mentioned read-out aiming at the visual reproduction of this image.

It aims more particularly at the cases in which the above mentioned image is created by the interaction of an appropriate penetrating radiation beam—usually X-rays—on the above mentioned sheet after traversal by this beam of an heterogeneous body whose different constituents present different degrees of transparencies to this radiation.

It is well known that this technique is commonly used to investigate the internal structure of objects, opaque to visible light, with the aim, for instance, of non-destructive testing of metallic objects or for the purpose of medical diagnosis.

A technique of this kind presents the advantage over that involving photographic detection of not requiring an expensive silver halide emulsion.

For instance selenium can be advantageously used for the recording of electric images, in accordance to what has been said before, with an X-ray radiation source or any ionizing radiation.

However, some of the above mentioned applications, and particularly those dealing with preventive medical diagnosis, are limited in their use by the large irradiation doses which are required for their optimum use.

In the measuring devices presently in use for the read-out of the electrical latent images, an opaque toner, liquid or pulverulent is projected on the sheet and selectively fixed according to the values of the superficial charges carried by this sheet, which requires large values of electrical densities of charges and charge differences in the distribution.

This limitation presents many drawbacks since large dose irradiations can be harmful for living organisms.

More precisely it prevents a generalized application of this method, for instance for preventive medical examinations such as required for early detection of breast cancer by mammography.

There exists in fact an other read-out method of sufficient accuracy and sensitivity to read-out a distribution of electric charges produced by X-ray irradiation, as mentioned above, this method requiring a significantly lower irradiation dose than the one required by the use of toners.

According to this method, the electric charges carried by the sheet are measured with an appropriate sensing probe disposed close to the sheet and moved so that the whole surface of the sheet can be successively scanned, said electric charges to be measured inducing on the probe image charges. This probe is associated with suitable electronic circuitry producing, at every instant, an electric signal s the amplitude of which is related to the value of the image charge induced at this instant and the sequence of signals s being recorded, and then processed for visual reproduction.

Unfortunately, if one wants to obtain for the images thus reproduced a sufficient spatial accuracy, for instance 0.1 mm, this read-out technique takes a very long time.

For the above mentioned accuracy of 0.1 mm, if the response time of the read-out system is 10 ms for every region of the sheet to be measured, the read-out time is of 1 mm$^2$ per 1 second: if the image to be analyzed is defined by a rectangle of 200 mm×300 mm, the read-out of this image would take 60,000 s, that is to say more than 16 hours, which is highly inpractical.

It is a particular object of the invention to reduce drastically the described read-out time without requiring larger densities or density fluctuations of the charges on the sheet, which permits a generalization of the above mentioned examination method, for intance for preventive medical diagnosis.

Accordingly the read-out devices according to the invention are essentially characterized by the provision of a rotating head carrying at one of its axial ends a probe, out of center with respect to the rotating axis Z of the head; means to rotate this head around its axis at a high speed; means to displace the head parallel to the sheet, or alternatively, along successively two perpendicular directions X and Y, parallel to the sheet and perpendicular to the axis Z in such a way as to have the probe moving along the sheet at a very small distance therefrom, or alternatively, along a circular trajectory combined with a transverse translation; means to determine at each instant the angular coordinate a of the probe around the axis Z as well as the coordinate x and y of this axis along the two directions X and Y; and means to transmit at each instant the information s, a, x and y, obtained at this instant to computing means and to a visualization system arranged in such a way as to record the informations s, a, x and y obtained, during the scanning process of the surface of the sheet, by the probe, and on the other hand, to produce a visible image each point of which, as defined by the coordinates a, x and y, has an intensity dependent on the amplitude of the corresponding signal s.

In preferred embodiments, recourse is had in addition to one or other of the following features:
- the rotation of the head is produced by a stream of gas acting on the rotor of a turbine fixed to this head,
- the rotation speed of the head is greater than 3,000 turns/minute and even reaches and goes beyond 10,000 t/mn,
- the probe appears at the frontal face of the head through an aperture made in a conductive plate limiting externally this frontal face, the probe being insulated from the edges of this aperture,
- the relative displacements along the direction X are separated from each other by the relative displacements along the direction Y the amplitude of which is roughly equal to the distance between the probe and the axis Z of the head,
- means are provided to produce signals S corresponding to the integral values of signals s and to exploit these signals instead of the above mentioned signals s for use in the visual reconstruction,
- each rotating head includes a plurality of electric charge detecting probes, all these probes being used simultaneously and in a similar way,
- in a read-out device according to the preceding paragraph, the different probes carried by the head are identical to each other and distributed in a regular way around the axis of this head, at a constant distance from this axis, the read-out device is equipped with several rotating heads of the above described type, fixed on a rigid support with their axes fixed to this support and parallel to each other, the signals produced by the probes carried by these different heads being processed simultaneously in a similar way, in a read-out device according to the preceding paragraph the axes of the different heads are distributed in such a way that the trajectories scanned by their probes overlap, in a read-out device according to the preceding paragraph the rotating heads are distributed in a staggered mode, the electric signal generated by the rotating probe is transmitted to the fixed part of the head by modulation of an electromagnetic wave (radio or optical), the electrical signal generated by the rotating probe is transmitted to the fixed part of the head by modulation of an acoustic wave, means are provided to determine at each instant the distance between the probe and the sheet in order to obtain an electrical signal depending on this distance and to make a compensation to cancel the variations of measured charges produced by the variations of this distance, in a read-out device according to the preceding paragraph, the detection means of the distance between the probe and the sheet include a distance measuring device mounted on the rotating head.

The invention includes, beside these principal features, some other features with are preferably used at the same time and which will be explicitly described thereafter.

In the following, preferred embodiments of the invention will be described with reference to the accompanying drawings given of course purely by way of non limiting illustration.

FIG. 1 of these drawings is a schematic view of, first, a rotating head equipped with an out of center probe being part of a read-out device in accordance with the invention and, second, a sheet the electric charge distribution of which is being read-out with the probe.

FIGS. 2 and 3 illustrate the way a charge distribution present on the sheet is read-out by such a probe.

FIGS. 4 and 5 show schematically such a head, respectively along an axial cut and a transverse cut, along V—V, FIG. 4.

FIGS. 6 and 7 are schematic drawings showing respectively two variations of the invention and concerning, in the first instance, a rotating head equipped with several out of center probes and, in the second, a read-out device equipped with several rotating heads.

Figure 8:
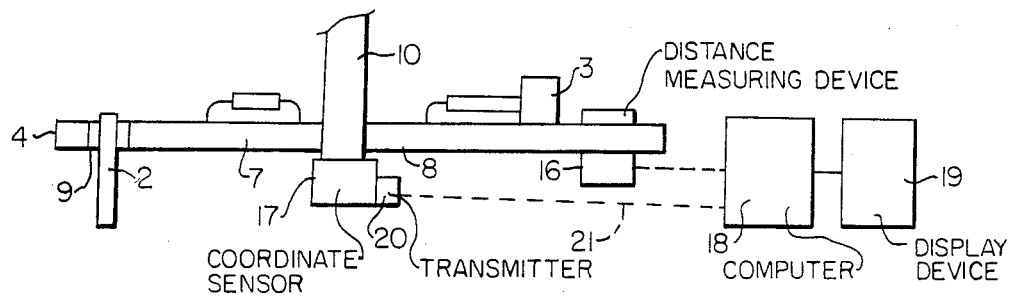
FIG. 8 is a detail similar to that of FIG. 4 illustrating a further embodiment of the invention.

The electrostatic image to be reproduced visually has been first formed by selective electrization of a dielectric sheet 1.

For a particularly advantageous application, this image is formed using an X-ray beam having traversed a body opaque to light, the sheet being made of a layer of selenium.

When the body is heterogeneous, that is to say when it has components with degrees of transparency to X-rays of different values, the regions more or less charged of said image made of electric charges are directly related with said components, depending on their degree of transparency.

A purpose of the invention is to visualize these differences in charges, that is to say to reconstitute from these an image showing the above mentioned components with their corresponding spatial position and the value of their opacity.

One uses for this purpose a probe 2 known in itself, that is to say made of an electrode with a narrow end suited to detect the quantities of charges q carried by the sheet 1 at positions facing the end of the probe.

This probe 2 is associated to an electronic circuit 3 comprising in general a second electrode (not represented) which acts as a support for the sheet 1—which then constitutes the dielectric of a capacitor formed by the two above mentioned electrodes—and means serving as a power supply and providing amplification. This circuit 3 produces electrical signals s the amplitude of which is related to the quantity of charges q' induced in the probe by the charges q.

In order to read-out the sheet one also displaces the probe 2 along the sheet, at a small distance from it, for instance 0.1 mm, in order to scan fully the surface of this sheet.

But, instead of making the scanning successively along parallel straight lines, it is done here at high speed along a circular trajectory T, displaced transversely along the sheet, parallel to a first direction X of this sheet, each complete scanning of this sheet along the direction X being itself followed by other parallel scannings parallel to this one but displaced successively with respect to each other, along the direction Y of the sheet 1, perpendicular to the direction X.

Each of these displacements is advantageously of an amplitude of the order of the radius R of the considered circular trajectory.

The successive scannings along direction X can all be done in the same direction or, on the contrary be done in alternated directions, corresponding to forward and backward motions.

The applicants have observed that by using such a rotation of the probe one could operate it at very high speeds.

Thus, if the probe is mounted on a rotating head 4 at 1.5 cm from the axis of the head and if this head is set in rotation at a speed of 6,000 t/mn, the linear speed of the probe is about 10 m/s.

Under these conditions, if the width of the surface of the sheet scanned by the probe is of order 0.1 mm, the total surface scanned by this probe is of order of 10 cm$^2$/s, thus, theoretically, without taking into account unavoidable overlapping, the total scanning of a rectangular foil of 200×300 mm$^2$ would require an analysis time of 1 minute only.

The applicants have observed in addition that a high rotation speed of the probe allows one to detect clearly differences in charge densities among the various charges regions of the sheet successively scanned and that these differences could be determined with an excellent signal/noise ratio if each region of the sheet were scanned several times by the probe.

Since, for many applications, one tries mainly to make visible the contours along which such differences appear, these lines permit to localize with accuracy the different components of the body to be analyzed, while the absolute values of the respective opacities of these components are of lower interest.

With the numerical example which has been given above, a multiplication by a factor 10 of the number of scannings of each region, in order to improve the signal to noise ratio, would lead to multiply by 10 the time necessary for the analysis, which would bring this one time to 10 minutes, a value which is still quite acceptable in many cases.

At each instant, the position of probe 2 with respect to the sheet 1 is perfectly defined by the coordinates x and y of the intersecting point of axis Z of head 4 with the foil along respectively the two directions X and Y and by the value a of the angular displacement of this probe with respect to a predetermined origin of direction around axis Z. To this end, a coordinate detector, indicated schematically at 17 in FIG. 8 and of conventional construction, is provided for this purpose.

The different electric informations or values s, a, x and y supplied at each instant are recorded in a computer (indicated at 18 in FIG. 8) and this computer is associated with a visualization means or display device such as (indicated at 19 in FIG. 8) cathode ray screen or other recorder so that after the end of the recording process the electromagnetic image of sheet 1 can be reproduced visually.

On this image, each point is represented by an intensity of light which depends on the amplitude of the corresponding electric signal s (or, more precisely to the mean of the electric signals s corresponding to successive scannings of the associated regions by the probe).

In FIG. 2, a sign or mark L has been represented as the character to be read on the sheet.

This sign has, on the right side, a part 5 which is relatively narrow and dark, and which is continued to the left by a surface 6 broader and lighter.

FIG. 3 shows in its upper part the shape of the signals s being produced respectively during the scanning of the probe 2 at the positions facing these two portions of the sign L, the amplitude of these signals, represented in ordinates, being represented as a function of the scanning angles a, represented in abscissas and expressed in degrees.

When the probe arrives at a position facing the part 5, the electric charge q' induced on it varies rapidly and successively with alternate signs, these two opposite variations being very close to each other in time. The same is true for the corresponding signal s as is visible in m in FIG. 3.

During the scanning of part 6, broader and less dense, the variations of charge q' and thus of signal s, are more reduced in amplitude and more delayed in time, as visible in n.

One then understands why the proposed method is particularly interesting for the reproduction of lines or points, lines or points corresponding, in the electrical image, to concentrations of electrical charges and, in the visualized image, to narrower and more contrasted regions.

It is also the case of the lines separating regions of different densities (of charges or light) in these images, regions corresponding to distinct components of the object under study or at least to several portions, of such a component, presenting differences in the degree of transparency to the penetrating radiation.

The precise reproduction of these different lines and limits can be sufficient for numerous applications.

For some applications however it can be advantageous to reproduce absolute values of the different densities of light of the mentioned regions, densities which are correlated to the corresponding absolute values of the electrical charge densities in the initial image.

To this and, means are provided to integrate the above mentioned signals s, which permits one to produce electrical signals S the amplitudes of which are related to said absolute values as is illustrated by the lower part of FIG. 3 in which one sees respectively in M and N the integrated signals S corresponding to the two regions 5 and 6 mentioned above.

The final reconstructed visual image can then be formed at will from one or the other of the series of signals s and S depending on the desire of the user, to emphasize the lines and density variations, or, to the contrary to obtain a relatively faithful reproduction of the electric images to be read-out.

As indicated above, in order to have the probe 2 following trajectories T, it is placed on an out of center position at the end of head 4 rotating around the axis Z.

This end is advantageously limited by a transverse disc (indicated at 7, 8) 7, which is at least externally coated with a conductive layer thereby insuring electrical shielding.

The probe 2 extends through an aperture made in this disc 7,8. It is separated from the edge of this aperture by a separating insulating ring 9 and protrudes axially out of this disc or extends to a position just flush with the surface of this disc.

The axis 10 of the rotating assembly can pivot inside a case 11 together with the blade rotor 12 of a small turbine.

The movement of this turbine is produced by a tangential stream of a gas such as air or dry nitrogen.

The disc 7,8 carries itself some of the elements of the electronic circuit 3 capable of generating the electrical signals s and/or S, these elements being distributed on the disc in such a way as to stabilize the mobile body thus avoiding the forces and distortions associated with an unbalanced eccentric mass.

The bandwidth of the electronic circuit 3 has to be such that each of the signals can be separated corresponding to the scanning by the probe 2, of a region, of the sheet 1, having the width l corresponding to the spatial resolution.

So, if this width l is on order of 0.1 mm and if the linear displacement speed of the probe and its diameter are respectively 10 m/s and 0.1 mm, said region is scanned by the probe in 10 microsecond and it is sufficient to have the bandwidth larger than 100 kHz.

The electrical connection between the moving part of circuit 3 and the rest of the read-out device which comprises, in particular the computer and, if necessary, the supply of electrical power, is established through the moving or rotating contacts mounted on axis 10 and contacted by a suitable pickup indicated schematically at 14.

In the case where the electric supply is connected by two such contacts to said moving part of the circuit 3, it is advantageous to place on this part of the circuit a capacitor mounted in parallel on these contacts, this capacitor replacing the external power supply during the short intervals when the rotating contacts are interrupted.

Since the electric power required for the operation of this part of the circuits is relatively small, one can obtain the electrical power from photovoltaic cells mounted on the rotating assembly, lighted and thus energized by an external light beam.

Instead of being transmitted by rotating contacts discussed above in connection with FIG. 4, the electrical signals, produced by the probe and the moving part of the circuit, can also be transmitted to the rest of the read-out device, e.g., computer 18 and display device 19 of FIG. 8, using a suitable transmitter 20, by modulation of an electromagnetic wave (radio or optical) or of an acoustical wave, indicated at 21.

Means are also provided to produce at each instant three signals allowing one to determine exactly the position of the probe 2 with respect to the sheet 1, namely:

the two coordinates x and y, considered along the directions X and Y of said sheet 1, of the intersection point of axis Z of head 4 with this sheet, and the angle a of the plane containing the axis Z and the axis of probe 2 with an other plane containing the axis Z and considered as origin, this plane of origin being, for instance parallel to direction X.

The three signals a, x and y are transmitted and recorded in the computer at the same time as the corresponding signal s and/or S.

In order to reconstruct visually at the end of this recording the initial electrical image, each point of this image, determined by its coordinates s, y and a is reproduced, for instance on a cathode ray tube the beam of which is scanned by the computer, with a degree of luminosity or darkness associated to the amplitude of signal s or S corresponding to this point.

As described above, the total time for recording an image according to the above described method, is only a few minutes, even with a single probe. The processing leading to the visual image after such a recording is practically instantaneous.

In order to even reduce more this duration of this recording one can make use of at least one of the two additional following improvements.

According to the first of these improvements one places on the rotating head 4 a plurality of probes 2, of number p (p being an integer equal to or larger than 2), similar in type to the single probe described above, each of the probes being used in the same way as the single probe.

The p probes above mentioned are preferably identical and distributed uniformly around axis Z, that is to say spaced with an angular distance equal to 360°/p and all at the same distance from axis Z.

For a given quality of the read-out and a given rotating speed of head 4, the spead of displacement of this head along the directions X and Y can then be multiplied by p, the total duration of the recording being then divided by this number p. In the example shown schematically in FIG. 6 the number p has been chosen equal to 6.

According to the second improvement, one makes use of several rotating heads 4 of number r (r being an integer at least equal to 2) of the type of the single head 4 described above, all these heads being mounted on the same frame 15 (FIG. 7) with their axes 2 parallel to each other.

The relative displacements along the directions X and Y are then partially made by the relative position of the various heads themselves.

If the number r or these heads is sufficient for these heads to scan already the totality of sheet 1, when the above mentioned relative displacement is occuring in a single direction, there is obviously no further need to provide a relative displacement along the second direction: thus, in the displacement mode illustrated schematically in FIG. 7, the relative displacement along direction X is sufficient.

The axes Z of the various heads 4 are set in such a way that the trajectories T scanned by their different heads 2 are overlapping.

The width of the overlapping strip is preferably slightly less than the radius R of the circle defining trajectory T in the preferred case where the different heads are distributed in a staggered mode as shown in FIG. 7.

Here again the duration of a recording is divided by the number r with respect to the case of the single head.

The two preceding improvements can be combined, which permits to reduce the total duration of the recording to a few seconds only.

In order to eliminate the systematic error which might occur due to the variations of the distance d between the probe 2 and the sheet 1, variations due mostly to irregularities of the surface of the sheet, it can be advantageous to use in addition the following method: one measures permanently this distance d, by mounting on the rotating head 6 a distance measuring device 16 (indicated by the interrupted lines on FIG. 4) and one associates to this device electronic means for the processing of the signals provided by this device in order to insure automatic compensation in said variations of the distance.

The measuring device 16 can be of any desirable type, for instance:

capacitive, forming itself one of the two electrodes of a capacitor, the other electrode of which is made by the conductive support of the sheet 1, optical, the desired detection using the reflection from the sheet or from its support of a light beam emitted by the measuring device.

One can mount this device 16 on the disc 7 in the immediate vicinity of probe 2.

Or, also, according to the variation illustrated schematically in FIG. 4, one mounts this device at a position diametrically opposed to the location of the probe, which may help in providing mechanical equilibrium, the signals produced respectively by the two detecting devices 2 and 16 being in this case delayed, during the recording, by the time it takes for the head to accomplish an angular displacement of half a turn around its axis.

Following this, and whatever the method of realization adopted, one obtains finally a system for the readout of electrical images the constitution of which, the operation and the advantages (mainly the possibility to read rapidly electrostatic images created from a non intense penetrating ionizing beam) result clearly from what has been described before.

As is obvious, and as results from what has been previously stated above, the invention is in no way limited to its modes of application and realization which have been particularly considered; it embraces, on contrary, all the variations, including notably:

those where the relative displacements between the rotating head 4 and the sheet 1 would be provided by rotating the head around its axis Z and by translating the sheet along the axis X and Y with respect to said non moving axis Z, and those where the rotation of the head would be provided by methods other than the pneumatic ones, for instance electrical ones.

We claim:

1. A read-out device for providing read-out of electric charges carried by a dielectric sheet, said device comprising a probe, means for providing relative displacement between said probe and sheet, said displacement taking place parallel to the sheet with said probe in close proximity to said sheet, and an electronic circuit for producing at each instant an electrical signal s the amplitude of which is related to the charge induced at this instant on the probe by the charges to be read-out which are carried by the sheet over a region facing the probe, said device further including a rotating head supporting, at one of the axial ends thereof the probe in out of center relationship with respect to the rotation axis Z of said head; means for rotating said head around the rotation axis thereof at a high speed; means for displacing the head parallel to the sheet; means for determining at each instant the angular coordinate a of the probe around the Z axis thereof, as well as the coordinates x and y of this axis in two directions X and Y; and means for transmitting at each instant the values s, a, x and y obtained at this instant, computing and visualization means for receiving the transmitted values s, a, x and y obtained during scanning of the surface of the sheet by the probe and for producing a visible image each point of which, as defined by the coordinates a, x and y, has an intensity dependent on the amplitude of the corresponding signal s.

2. Read-out device according to claim 1, wherein rotation of the head is produced by a stream of gas acting on the rotor of a turbine fixed to this head.

3. Read-out device according to claim 1, wherein the rotation speed of the head is greater than 3000 turns/minute and can be greater than 10,000 turns/minute.

4. Read-out device according to claim 1, wherein the probe is disposed at the frontal face of the head and extends through an aperture in a conductive plate limiting externally this frontal face, the probe being insulated from the edges of this aperture.

5. Read-out device according to claim 1, wherein the relative displacements along the direction X are separated from each other by relative displacements along the direction Y whose amplitude is roughly equal to the distance between the probe and the Z axis of the head.

6. Read-out device according to claim 1, further comprising means for producing signals S corresponding to integrated values of said signals s and for utilizing these signals instead of the signals s, for producing said visible image.

7. Read-out device according to claim 1, wherein each rotating head includes a plurality of electric charge detecting probes, said probes being used simultaneously and in a similar way, the different probes carried by head being identical to each other and distributed in a predetermined pattern around the axis of said head at a contant distance from that axis.

8. Read-out device according to claim 1, wherein said devices comprises a plurality of rotating heads fixed on a rigid support with their axes fixed to this support and extending parallel to each other, the signals produced by the probes carried by these different heads being processed simultaneously.

9. Read-out device according to claim 1, wherein the electric signal generated by the rotating probe is transmitted to a fixed part of the head by modulation of electromagnetic waves.

10. Read-out device according to claim 1, further comprising distance determining means for determining, at each instant, the distance d between the probe and the sheet in order to obtain an electrical signal depending on this distance d and for providing compensation for the variations of measured charges produced by the variations in this distance, said distance determining means including a distance measuring device mounted on the rotating head.

11. Read-out device according to claim 1 wherein the electric signal generated by the rotating probe is transmitted to a fixed part of the head by modulation of accoustic waves.

12. A read-out device for providing read-out of electric charges carried by a dielectric sheet, said device comprising a probe, means for providing relative displacement between said probe and sheet, said displacement taking place parallel to the sheet, with the probe in close proximity to said sheet, and an electronic circuit for producing at each instant an electrical signal s the amplitude of which is related to the charge induced at this instant on the probe by the charges to be read-out which are carried by the sheet over a region facing the probe, said device further including a rotating head supporting, at one of the axial ends thereof the probe in out of the center relationship with respect to the rotation axis Z of said head; means for rotating said head around the rotational axis thereof at a high speed; means for displacing the head successively in two perpendicular directions X an Y parallel to the sheet, and perpendicular to the axis Z such that the probe moves along the sheet at a very small distance therefrom; means for determining at each instant the angular coordinate a of the probe around the Z axis thereof, as well as the coordinates x and y of this axis in two directions X and Y; and means for transmitting at each instant the values s, a, x and y obtained at this instant, computing and visualization means for receiving the transmitted values s, a, x and y obtained during the scanning of the surface of the sheet by the probe and for producing a visible image each point of which, as defined by the coordinates a, x and y, has an intensity dependent on the amplitude of the corresponding signal s.

13. A read-out device for providing read-out of electric charges carried by a dielectric sheet, said device comprising a probe, means for providing relative displacement between said probe and sheet, said displacement taking place parallel to the sheet, with the probe in close proximity to said sheet, and an electronic circuitry for producing at each instant an electrical signal s the amplitude of which is related to the charge induced at this instant on the probe by the charges to be read-out which are carried by the sheet over a region facing the probe, said device further including a rotating head supporting, at one of the axial ends thereof, the probe in out of the center relationship with respect to the rotation axis Z of said head; means for rotating said head around the rotational axis thereof at a high speed; means for displacing the head along a circular trajectory combined with a transverse translation; means for determining at each instant the angular coordinate a of the probe around the Z axis threof, as well as the coordinates x and y of this axis in two directions X and Y; and means for transmitting at each instant the values s, a, x and y obtained at this instant, computing and visualization means for receiving the transmitted values s, a, x and y obtained during scanning of the surface of the sheet by the probe and for producing a visible image each point of which, as defined by the coordinates a, x and y, has an intensity dependent on the amplitude of the corresponding signal s.

* * * * *